United States Patent [19]

Nomura et al.

[11] Patent Number: 5,541,096
[45] Date of Patent: Jul. 30, 1996

[54] PHOTOCATALYST AND PROCESS FOR PURIFYING WATER WITH SAME

[75] Inventors: Eiji Nomura; Tokuo Suita, both of Kusatsu, Japan

[73] Assignee: Ishihara Sangyo Kaisha, Ltd., Osaka, Japan

[21] Appl. No.: 272,666

[22] Filed: Jul. 11, 1994

[30] Foreign Application Priority Data

Jul. 12, 1993 [JP] Japan .................................. 5-193844
Oct. 8, 1993 [JP] Japan .................................. 5-277747

[51] Int. Cl.$^6$ .............................. B01J 19/08; B01J 21/16; B01J 35/02; C12N 11/14
[52] U.S. Cl. ................... 435/176; 435/243; 435/252.1; 435/262; 435/264; 210/601
[58] Field of Search .................................. 435/243, 176, 435/252.1, 262, 264

[56] References Cited

U.S. PATENT DOCUMENTS 4,859,594  8/1989  Portier ...................................... 435/176

FOREIGN PATENT DOCUMENTS

| 600289 | 8/1990 | Austria . |
| 4110227 | 10/1992 | Germany . |
| 60-11829 | 1/1985 | Japan . |
| 60-118289 | 6/1985 | Japan . |
| 60-118236 | 6/1985 | Japan . |
| 63-42792 | 2/1988 | Japan . |
| 63-248443 | 10/1988 | Japan . |
| 1-218635 | 8/1989 | Japan . |
| 5-96180 | 4/1993 | Japan . |
| 5-123699 | 5/1993 | Japan . |

OTHER PUBLICATIONS

Patent Abstract of Japan, vol. 13 No. 56 (C–566) Feb. 1989 re JP A 63 248 443.
Patent Abstract of Japan, vol. 9 No. 267 (C–310) Oct. 1985 re JP A 60 118 236.

*Primary Examiner*—Herbert J. Lilling
*Attorney, Agent, or Firm*—Cushman, Darby & Cushman

[57] ABSTRACT

A photocatalyst comprising inorganic porous particles having photosemiconductor particles deposited on at least a part of the surfaces and at least a part of the walls of the pores of the particles, and a photocatalyst comprising inorganic porous particles having photosemiconductor particles and microorganisms possessing water purification activity deposited on at least a part of the surfaces and at least a part of the walls of the pores of the particles are disclosed. The photocatalysts have a stable photocatalytic function for an extended period of time and easy separability from the treated water system so that it is useful for various photocatalytic reactions. Particularly they can be effectively used in water purification, and allow annihilation of harmful organisms such as algae, fungi and bacteria, decomposition of deleterious materials, as well as deodorization and decoloration to be conveniently and easily accomplished.

5 Claims, 1 Drawing Sheet

PHOTOCATALYST AND PROCESS FOR PURIFYING WATER WITH SAME

BACKGROUND OF THE INVENTION

1. Field of the Invention

The present invention relates to a photocatalyst and a process for purifying water by utilizing the function of the photocatalyst.

2. Description of the Related Art

Inhabitant waste waters, irrigation discharge waters and industrial exhaust waters often contain a lot of nitrogenous and phosphorous materials which are provoking eutrophication phenomenon in lakes, marshes, rivers, sea gulfs and bays. The eutrophication causes enhanced growth of plankton, picoplankton, water-bloom, peridinium, and algae, which renders the waters moldy owing to malodorous 2-methylisoborneol given off by a kind of plankton, phormidium or oscillatoria and adversely affects inhabitant environment, especially water for living. The eutrophication promotes production of water-bloom and limnetic red-water coloring waters of lakes, marshes and rivers green or brown as well as production of so-called red-water coloring sea water reddish brown, pink or brown, which impair the scenery, consume oxygen in waters to cause the lack of oxygen therein. The enormous growth of plankton may cause clogging of the gills of fish with the plankton resulting in tremendous damages in marine products. The extraordinary growth of algae may cause clogging of filter screens in water purification facilities, dams and cleaning ponds to interfere with water purifying treatment.

Moreover, inhabitant waste waters, irrigation discharge waters and industrial exhaust waters may contain fungi such as Eumycetes, actinomycetes, for example, mold, bacteria such as coliform bacteria which may be grown in lakes, marshes, rivers, sea gulfs and bays. Microorganisms includes not a few harmful bacteria such as infectious disease-causing bacteria such as typhoid bacillus and dysentery bacillus, corrosion promoting bacteria such as sulfur bacteria, iron bacteria, sulfate-reducing bacteria, slime bacteria, Eumycetes, actinomycetes rendering water malodorous which have led to occurrence of various disasters. Particularly, in nursery regions such as ponds and water containers cultivating animals living in water such as fish, shell-fish, crab, lobster and frog, and plants living in water such as seaweeds and marine algae as well as ornamental ponds and water baths raising fish and the like, there are often caused contamination of water and evolution of malodorous gases owing to fecal matter and deteriorated feed, and growth of fungi and bacteria on the fecal matter and deteriorated feed.

Aside from the foregoing, inhabitant waste waters, irrigation discharge waters and industrial exhaust waters may contain oxygen-demanding substances such as detergents, oils and the like, deleterious substances such as halogenated organic compounds which may be contained in waste water from semiconductor production factories, and pesticides. These deleterious substances may contaminate lakes, marshes, sea gulfs and bays with damages to organisms living therein.

The methods to be employed for killing the algae, fungi and bacteria grown include, for example, treatments with chlorine, ozone, copper sulfate, and ultraviolet radiation. In order to remove the malodorous substances and colored materials generated by the algae, fungi and bacteria, for example, an adsorption method with activated carbons has been employed. Particularly, water purification facilities drawing waters from lakes, marshes and rivers which have been seriously contaminated have expended substantial effort to improve the quality of the waters by introducing a tremendous amount of activated carbon. On the other hand, an attempt has been proposed to effect sterilization or deodorization by making use of high reducing ability of electrons generated in the conduction band and high oxidizing ability of holes generated in the valence band due to the light excitation which may be caused by irradiating photosemiconductor particles such as titanium oxy compounds with light rays having an energy exceeding the forbidden bandgap.

The aforementioned techniques using treatments with chlorine and ozone can reduce the amounts of the algae, fungi and bacteria in an insufficient manner to achieve a desired effect. In addition they may produce problems of requiring an extended period of time for the treatments and residual chemical compounds in the treated waters which may be the used chemicals themselves or compounds derived therefrom. The adsorption technique using activated carbon can not achieve extinction of the algae, fungi and bacteria, though it can reduce odor and color. The aforementioned method using photosemiconductor particles accomplishes the treatment in the system containing dispersion of ultra-fine particles of photosemiconductor in order to enhance the utilization efficiency of the light rays irradiated as well as the photocatalytic function of the photosemiconductor particles. For this reason, the photosemiconductor particles must be separated from the treated water systems and this separation is extremely difficult. Thus the method has not found practical application.

The present inventors have made an intensive research to develop process for purifying water by achieving extinction of harmful organisms such as algae, fungi and bacteria and decomposition of deleterious substances taking account of the photocatalytic function of photosemiconductor particles. As a result, we have found that (1) the use of composites comprising various supports having photosemiconductor particles deposited on their surfaces in order to facilitate the separation of photosemiconductor particles to be used as photocatalyst leads to occurrence of abrasion and fracture of the composites due to collision with one another and contact with the treated water accompanied by release of photosemiconductor particles from the surfaces of the supports and exposure of the faces on which no photosemiconductor particle is deposited, thereby cause a reduction in photocatalytic function of the composites in a short period of time, while the use of inorganic porous particles as alternative supports allows retention of the photocatalytic function of the composites for a prolonged period of time owing to the photosemiconductor particles deposited on the pores and/or voids of the inorganic porous particles; (2) disposition of such photocatalysts in the places capable of coming into contact with the water to be treated and subsequent irradiation of the photocatalysts with light rays containing ultraviolet radiation enable the killing of algae, fungi and bacteria, deodorization, decoloration, and decomposition of deleterious substances to be performed easily and conveniently, resulting in purification of the treated water; (3) moreover, microorganisms having a function of water purification can be immobilized on the inorganic porous particles together with deposition of photosemiconductor particles so that both the photocatalytic function of the photosemiconductor particles and the water purification function of the microorganisms can facilitate the purification of water in a short period of time. The present invention is completed based on these findings and further investigation.

SUMMARY OF THE INVENTION

An object of the present invention is to provide a photocatalyst capable of exhibiting stable photocatalytic function for an extended period of time.

Another object of the present invention is to provide a photocatalyst comprising inorganic porous particles having photosemiconductor particles deposited on at least a part of the surfaces and at least a part of the walls of the pores of the particles.

Still another object of the present invention is to provide a photocatalyst comprising inorganic porous particles having photosemiconductor particles and microorganisms possessing water purification activity deposited on at least a part of the surfaces and at least a part of the walls of the pores of the particles.

Still another object of the present invention is to provide a process for purifying water comprising the steps of disposing the photocatalyst as described above in the places where said photocatalyst comes into contact with water to be treated, and then irradiating said photocatalyst with light rays containing ultraviolet radiation.

Still another object of the present invention is to provide a process for purifying water comprising the steps of disposing the photocatalyst as described above in the places where said photocatalyst comes into contact with water to be treated, and then irradiating said photocatalyst with light rays containing ultraviolet radiation to perform the purification of the treated water by the photocatalytic function of the photocatalyst as well as the purification of the treated water by the water purification activity of the microorganisms deposited on the photocatalyst in the regions not exposed to the light rays containing ultraviolet radiation in the same reaction system.

DETAILED DESCRIPTION OF PREFERRED EMBODIMENTS

Figure 1:
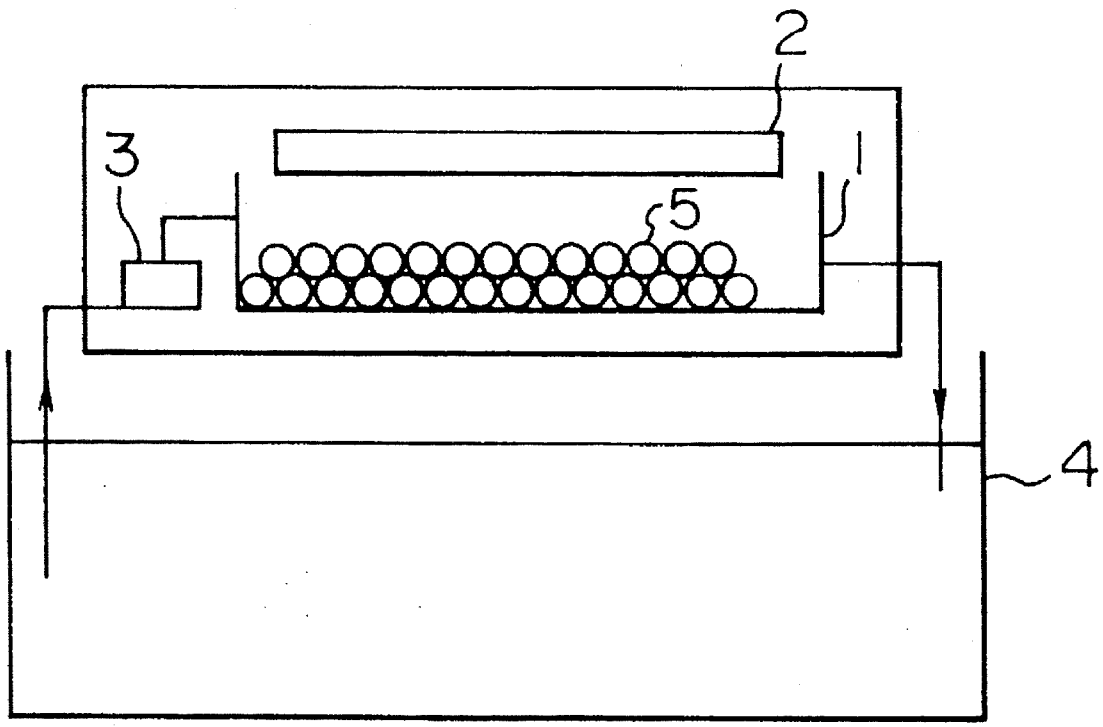
FIG. 1 shows a schematic view of the water container used in the tests conducted in Examples.

The process for purification of water in accordance with the present invention is most suitable for the purification of waters such as waters of lakes, marshes, rivers and sea, waters usable directly or indirectly for life such as water in a reservoir, for example, storage tank, water or warm water supplied from solar heating systems, water in air conditioners, water for bath, water for pools, water supply, drinking water, and the like, those in nurseries raising animals living in water, waste waters such as inhabitant waste water as discharged from domestic life, waste water exhausted from golf links, industrial waste water and the like.

The photocatalysts of the present invention comprise inorganic porous particles having photosemiconductor particles deposited on at least a part of the surfaces of the inorganic porous particles and at least a part of the walls of pores and/or voids thereof. Particularly, preferred photocatalysts are those where the pores and/or voids of the inorganic porous particles are filled with the photosemiconductor particles. As used in this specification, the term "inorganic porous particles", which can be used in the present invention, designates to inorganic particles having pores and/or voids (referred to simply as pores hereinunder) therein, including naturally occurring and artificial mineral particles. The naturally occurring mineral particles to be used include, for example, porous rocks such as andesite, dacite, rhyolite, shale, sandstone, and conglomerate, materials containing porous rocks such as pumice tuff, mudstone, pebbles, sand, silt, clay, and volcanic ash, scoria, scoria tuff, scoria-containing materials, fired pearlite, fired obsidian, fired pumice, vermiculite, zeolite, mica, coral sand, seashell, bakuhanseki (main components: about 70% $SiO_2$, about 14% $Al_2O_3$ and about 2–3% $Fe_2O_3$) and the like. Artificial inorganic porous particles to be used include artificial aggregates such as artificial pumice, artificial pebbles, artificial sand, and MESALITE (main components: about 70% $SiO_2$, about 15% $Al_2O_3$ and about 5% $Fe_2O_3$; available from JAPAN MESALITE KOGYO), CRYSVARL (main components: about 86–87% $SiO_2$, about 5–7% $Al_2O_3$ and about 1–3% $Fe_2O_3$; available from NITTETSU INDUSTRY), porous glass, hollow glass, porous blocks, porcelain, and the like. Other inorganic porous particles such as ceramics, for example, synthetic zeolites, foamed silica, activated carbon, charcoal, carbon, cokes, fly ash, blast furnace slag, foamed concrete (ALC), light weight concrete, and the like may be used either intact or in the form of pellets or moldings. In the present invention, naturally occurring minerals are preferred because of having higher void volume and being inexpensive.

Photosemiconductor particles having photocatalytic function include known photocatalysts such as titanium oxy compounds, zinc oxide, tungsten oxide, iron oxide, strontium titanate, molybdenum sulfide, cadmium sulfide, and the like, which can be used alone or in combination of two or more. Particularly, preferred are titanium oxy compounds having a higher photocatalytic function, higher chemical stability and being harmless. As used in the present invention, the term "titanium oxy compounds" refers to those so-called titanium oxide, hydrated titanium oxide, hydrous titanium oxide, metatitanic acid, orthotitanic acid, titanium hydroxide and the like, the crystal form of which is not critical. The titanium oxy compounds as above may be produced by any one of a variety of known methods. For example, one may make mention of the methods where (1) titanium compounds such as titanyl sulfate, titanium chloride, and organic titanium compounds are hydrolyzed in the presence of seeds for nucleation, if necessary, (2) an alkali is added to titanium compounds such as titanyl sulfate, titanium chloride, and organic titanium compounds in the presence of seeds for nucleation, if necessary, to neutralize, (3) titanium chloride, organic titanium compounds are oxidized in vapor phase, and (4) the titanium oxy compound obtained in the processes (1) or (2) is fired. In particular, the titanium oxy compound produced in the methods (1) and (2) are preferred because of its higher photocatalytic function. Improvement in photocatalytic function of photosemiconductor particles may be achieved by coating the surfaces of the photosemiconductor particles with metal such as platinum, gold, silver, copper, palladium, rhodium, ruthenium, and/or metal oxide such as ruthenium oxide, nickel oxide and the like.

The present invention provides a photocatalyst comprising inorganic porous particles having photosemiconductor particles and microorganisms capable of purifying water deposited on the surfaces and the walls of the pores of the inorganic porous particles. Microorganisms having water purification function to be preferably used include at least one selected from the group consisting of nitrite bacteria, nitrate bacteria and sulfur bacteria. The deposition of microorganisms having water purification function may be accomplished by a method comprising immersing inorganic porous particles or those having photosemiconductor particles deposited into a solution containing cultivated microorganisms therein, or a method comprising spraying a solution containing cultivated microorganisms therein onto inorganic porous particles or those having photosemiconductor particles deposited. The amount of microorganisms having water purification function to be deposited may be determined in a routine procedure.

The apparent specific gravity of the photocatalysts according to the present invention may be optionally controlled by selecting optionally inorganic porous particles and the amount of photosemiconductor particles to be deposited. An apparent specific gravity of the photocatalysts of higher than one allows the photocatalysts to be settled and immobilized on the bottom of a water-existing region rendering preferably the photocatalysts less releasable from the region. An apparent specific gravity of the photocatalysts of not higher than one allows the photocatalysts to disperse in the water to be treated or to float on the surfaces thereof to achieve more frequent contact with algae and the like to be treated so that the photocatalysts can perform more efficiently their function, though means to prevent the photocatalysts from flowing out the region must be provided. The photocatalysts of the present invention should have an average particle size of preferably 0.1 mm or more, more preferably 0.1 to 100 mm, and most preferably 1 to 100 mm, because in such ranges the photocatalysts are less likely to flow out from the region and become more manageable. The amount of the photosemiconductor particles to be deposited can be optionally determined, but suitably on the order of 0.5 to 70% by weight.

The photocatalysts of the present invention may be produced by suspending the photosemiconductor particles as described above in a solvent such as water, alcohol or toluene with adding any one of various dispersants and binders, if necessary. Inorganic porous particles are added to the resulting dispersion, and if necessary, subjected to degassing treatment, to impregnate with the dispersion. Alternatively, inorganic porous particles may be immersed in the dispersion, dip-coated or sprayed with the dispersion to coat the surfaces of the particles with the dispersion, then dried to deposit the photosemiconductor particles on at least a part of the surfaces and on at least a part of the walls of the pores of the inorganic porous particles, possibly to fill the pores with the photosemiconductor particles. The deposited photosemiconductor particles may be fired, if necessary, thereby achieving a firm adhesion of the photosemiconductor particles to the inorganic porous particles. The firing should be accomplished suitably by heating at a temperature of not less than 100° C., preferably in the range of 200° to 800° C., most preferably 300° to 800° C. In particular, it is preferred to dispersing to a great extent the titanium oxy compound obtained by the methods (1) and (2) in a solvent to produce a titanium oxide sol, and then coating or spraying the sol on the surface of the particles.

Chemical compounds, precursors of the photosemiconductors may be hydrolyzed or neutralized in the presence of inorganic porous particles to deposit the photosemiconductor particles on the inorganic porous particles, which are dried, or fired. Alternatively, photosemiconductor particles and inorganic porous particles may be mixed as in a mixer, and then the resultant mixture dried or fired. In this way the photocatalysts of the present invention can be produced.

The purification of waters with the photocatalysts of the present invention can be performed by disposing the photocatalysts in the regions where they come into contact with the waters to be treated such as lakes, marshes, rivers, sea gulfs and bays, the shores thereof, waterways, water storages, sections cultivating fish and animals living in water, or by throwing the photocatalysts into the regions. The disposed photocatalysts are then irradiated with light rays containing ultraviolet radiation to activate the photocatalytic function of the photosemiconductor particles so as to effect the purification of the waters treated. The light rays containing ultraviolet radiation include sun's rays as well as light rays from fluorescent lamps, black lamps, Xenon flash lamps, and mercury lamps. Particularly preferred are light rays containing near ultraviolet radiation of 300 to 400 nm. The intensity and the irradiation time of the light rays containing ultraviolet radiation may be selected optionally depending upon the degree of contamination of the waters to be treated. The irradiation of the photocatalysts with the light rays containing ultraviolet radiation can be accomplished by any one of routine methods, for example, irradiation from above the surface of the water, irradiation from within the water in which a light source is placed, or irradiation of a water container at the side transparent walls thereof when the water in the container is treated.

The disposition of the photocatalysts of the present invention in the regions as described above, at which the photocatalysts come into contact with the waters to be treated, and the subsequent irradiation of the photocatalysts with the light rays containing ultraviolet radiation allows the purification of the treated waters owing to the photocatalytic function of the photocatalysts at the irradiated places, in addition occurrence of deposition on the inorganic porous particles of microorganisms having water purification ability grown in the same reaction regions which have not been subjected to the irradiation with the light rays containing ultraviolet radiation, though microorganisms having water purification ability may be previously deposited on the photocatalysts, which microorganisms also achieve water purification.

The present invention is illustrated with reference to the following examples, without being limited thereto.

EXAMPLE 1

Acidic titania sol (CS-C, available from ISHIHARA SANGYO), which had been produced by thermally hydrolyzing titanyl sulfate, was diluted with water to a 40 grams/liter expressed as $TiO_2$. Into this diluted solution were immersed gardening pumice particles having an average particle size of 15 mm (available from HYUEGA SOIL Co., under tradename HYUEGA SOIL) for 2 hours, then neutralized to pH 7 with an addition of ammonia water to deposit titanium oxy compounds on the surfaces of the HYUEGA SOIL particles as well as on the walls of the pores thereof. The titanium oxy compounds deposited particles were separated by filtration, washed with water, dried, and then calcined in air at a temperature of 600° C. for 2 hours. The calcined particles were washed with water and dried to yield a photocatalyst having an apparent specific gravity of 1.0 of the present invention, denoted A hereinunder. This photocatalyst A contained an amount of titanium oxy compounds expressed as $TiO_2$ deposited of 2.5 parts by weight based on 100 parts by weight of HYUEGA SOIL.

COMPARATIVE EXAMPLE 1

The procedure as in Example 1 was repeated, except that HYUEGA SOIL particles having no titanium oxy compounds was used as comparative sample.

2 kg of the photocatalyst A of Example 1 and 2 kg of the particles obtained in Comparative Example 1 were packed on the bottom of a water container, respectively. 50 liters of water to be treated were charged in the container, and 20 gold fishes (Wakin) were raised while irradiating from outside the water container with light rays from two 20 W fluorescent lamps. Into the water container 0.5 gram of food was fed two times a day. After three weeks, an aliquot of the treated water from each container was taken and evaluated for the transmittance at a wavelength of 600 nm. The treated water of Example 1 had a transmittance of 95.0 %, while that of Comparative Example 1 had a transmittance of 28.2% indicating that remarkable effects in preventing contamination of water was observed in Example 1. In the water container of Comparative Example 1, there was observed the growth of phytoplanktons after one week, while little growth of phytoplanktons was observed in the water container in Example 1 after three weeks. Thereafter, after further two weeks had elapsed, the growth of green phytoplanktons was observed on a part of the surfaces of the photocatalysts, and however, the green part planktons turned black after two or three days elapsed. This was attributed to killed phytoplanktons by the photocatalytic function of the titanium oxy compounds. This confirmed that the titanium oxy compounds have algicidal activity. After four weeks from the startup of the test, the number of living bacteria and that of coliform bacteria were examined by the method as described under to find that the treated water in Example 1 contained 6820 living bacteria/milliliter and 3750 coliform bacteria/milliliter, while that in Comparative Example 1 contained 8000 living bacteria/milliliter and 4700 coliform bacteria/milliliter. Thus, the photocatalyst A could suppress the growth of fungi and bacteria. It has been also confirmed that the photocatalyst A retained its photocatalytic function without substantial variation thereof for two years.

Method for Measurement of Living Bacteria and Coliform Bacteria

A sample water taken from the water container was diluted 10 times and 100 times with an aseptic water, and one milliliter of the resulting liquid was poured on each of five sterilized schale, into which 10 milliliters of a culture medium were added, stirred, cultured strength 37° C. one overnight, and the next day the number of colonies was counted.

Culture Medium Used

Brain-heart infusion bouillon: Living bacteria (available from NISSUI Co.)

Deoxycholate-medium: Coliform bacteria (available from NISSUI Co.)

EXAMPLE 2

Into an acidic titania sol (CS-C, available from ISHIHARA SANGYO), which had been produced by thermally hydrolyzing titanyl sulfate, having a concentration of 400 grams/liter expressed as $TiO_2$ were immersed gardening pumice particles having an average particle size of 15 mm (available from HYUEGA Co., under tradename HYUEGA SOIL) for 2 days, then the HYUEGA SOIL particles were filtered, washed with water, dried to deposit titanium oxy compounds on the surfaces of the HYUEGA SOIL particles as well as on the walls of the pores thereof. Then the titanium oxy compounds were further filled into the pores of the HYUEGA SOIL particles. The titanium oxy compound deposited-particles were calcined in air at a temperature of 600° C. for 2 hours. The calcined particles were washed with water and dried to yield a photocatalyst having an apparent specific gravity of 1.2 of the present invention, denoted B hereinunder. This photocatalyst B contained an amount of titanium oxy compounds expressed as $TiO_2$ deposited of 35 parts by weight based on 100 parts by weight of HYUEGA SOIL.

300 g of the photocatalyst B of Example 2 were packed on the bottom of a container containing 50 liters of the water of Lake BIWAKO which has been being used as water for inhabitant life. The container was irradiated from outside with light rays from two black lamps and variation in the concentration of 2-methylisoborneol, a musty component, were monitored. The concentration of 2-methylisoborneol was changed from 27 ppt before irradiation to 10 ppt after 30 minutes of irradiation, i.e., too lower level for human to smell the musty odor. It has been confirmed that the photocatalyst B retains its photocatalytic function for two years without substantial variation thereof.

Inhabitant waste water was similarly treated with the photocatalyst B. As a result, the organic substances included in the waste water were decomposed to reduce the COD value.

For comparison, the same treatment was conducted as in Example 2, except that the photocatalyst B was not used, to monitor the variation in the concentration of 2-methylisoborneol. As a result, the concentration of 2-methylisoborneol was found to remain unchanged.

The inhabitant waste water was similarly treated. As a result, the organic substances included in the waste water were not decomposed with the COD value remaining unchanged.

EXAMPLE 3

Into a dispersion of a culture liquid with Nitrosomonas and Trobaror cultured as nitrate bacteria in 2 liters of a sterilized water, there was immersed 1 kg of the photocatalyst B produced in Example 2 for 1 hour, then the photocatalyst B was separated, and dried with air at room temperature to produce a photocatalyst having the microorganisms having water purification activity and the photosemiconductor particles deposited according to the present invention, denoted C hereinunder.

Each of 1 kg of the photocatalyst B of Example 2, 1 kg of the photocatalyst C of Example 3, and 1 kg of the sample of Comparative Example 1 and commercially available nylon wool filter (Comparative Example 2) for the purpose of comparison was packed to a height of 80 mm in a vessel 1 (320 mm wide×115 mm long×100 mm high) equipped with a pump for circulating water 3 as shown in FIG. 1. A 10 W black lamp 2 was fixed at a height of 50 mm from the surface of the effluent water when the water was circulated. The vessel filled with the photocatalyst 5 was placed on the water container 4, in which 20 gold fishes were raised in 50 liters of water, and the water in the container was circulated through the vessel 1 at a flow rate of 10 liters per minute while monitoring the variation in the concentration of $NH_4$ and $NO_2$ toxic for gold fishes. The results of the variation in the concentration of $NH_4$ were shown in Table 1 and those of $NO_2$ were in Table 2, and further those of the nitrogen trioxide ($NO_3$) produced by oxidation of $NO_2$ were shown in Table 3. When the photocatalysts B and C of Examples 2 and 3 were used, the concentrations of $NH_4$ and $NO_2$ were found to be retained at a lower level. Particularly the photocatalyst C deposited with the microorganisms having water purification activity and the photosemiconductor particles had much higher performance. This is attributed to the oxidation of $NH_4$ and $NO_2$ into lower toxic nitrogen trioxide ($NO_3$) owing to the photocatalytic function of the photosemiconductor particles. In the case of the photocatalyst C, the combination of the photocatalytic function of the photocatalyst in the regions irradiated with the light rays containing ultraviolet radiation and the water purification activity of the microorganisms deposited on the photocatalyst in the regions not exposed to the light rays containing ultraviolet radiation in the same reaction system allowed more prompt oxidation of $NH_4$ and $NO_2$ into nitrogen trioxide ($NO_3$). On the other hand, the use of the sample of Comparative Example 1 and the nylon wool filter of Comparative Example 2 for the purpose of comparison was found to lead to an increase in the concentrations of $NH_4$ and $NO_2$. A reduction in the concentration of $NH_4$ was achieved in 3 to 4 weeks after the startup of the test even when the sample of Comparative Example 1 and the nylon wool filter of Comparative Example 2 were used as comparative samples which may presumably be attributable to the gradual growth of microorganisms which purify the water.

TABLE 1

| Period (Week) | Concentration (ppm) | | | | | | |
|---|---|---|---|---|---|---|---|
| | 0 | 1 | 2 | 3 | 4 | 5 | 6 |
| Example 2 | 0 | 2.3 | 0.2 | 0 | 0 | 0 | 0 |
| Example 3 | 0 | 1.1 | 0.1 | 0 | 0 | 0 | 0 |
| Comp. Ex. 1 | 0 | 4.6 | 10.0 | 9.0 | 6.1 | 4.2 | 1.6 |
| Comp. Ex. 2 | 0 | 3.2 | 5.6 | 3.3 | 2.2 | 1.7 | 0.8 |

TABLE 2

| Period (Week) | Concentration (ppm) | | | | | | |
|---|---|---|---|---|---|---|---|
| | 0 | 1 | 2 | 3 | 4 | 5 | 6 |
| Example 2 | 0 | 0.1 | 20 | 0.2 | 0 | 0 | 0 |
| Example 3 | 0 | 0.1 | 17 | 0.1 | 0 | 0 | 0 |
| Comp. Ex. 1 | 0 | 0.3 | 3.9 | 3.9 | 44 | 50 | 10 |
| Comp. Ex. 2 | 0 | 0.2 | 39 | 6.5 | 3.5 | 0.5 | 0.2 |

TABLE 3

| Period (Week) | Concentration (ppm) | | | | | | |
|---|---|---|---|---|---|---|---|
| | 0 | 1 | 2 | 3 | 4 | 5 | 6 |
| Example 2 | 0.5 | 0.7 | 14 | 67 | 94 | 123 | 144 |
| Example 3 | 0.6 | 0.8 | 16 | 70 | 104 | 138 | 156 |
| Comp. Ex. 1 | 0.1 | 0.6 | 1.0 | 1.8 | 3.4 | 7.4 | 24 |
| Comp. Ex. 2 | 0.6 | 0.6 | 0.9 | 10 | 76 | 94 | 118 |

EXAMPLE 4

Into an acidic titania sol (CS-N, available from ISHIHARA SANGYO), which had been produced by thermally hydrolyzing titanyl sulfate, having a concentration of 400 grams/liter expressed as $TiO_2$ were immersed 400 grams of MESALITE (tradename) particles having an average particle size of 5 mm (available from MESALITE KOGYO) for 1 hour, then the MESALITE particles were separated by filtration, and dried to deposit titanium oxy compounds on the surfaces of the MESALITE particles as well as on the walls of the pores thereof. Then the titanium oxy compounds were further filled into the pores of the MESALITE particles. Subsequently the titanium oxy compound deposited particles were calcined in air at a temperature of 500° C. for 2 hours. Then the calcined particles were washed with water and dried to yield a photocatalyst D of the present invention. This photocatalyst D had an amount of titanium oxy compounds expressed as $TiO_2$ deposited of 2.0 parts by weight based on 100 parts by weight of MESALITE particles.

25 g of the photocatalyst D were placed in a 8 liter glass container and a malodorous gas, acetaldehyde, was added to the container to a level of 70 ppm and the container was sealed. The container was irradiated externally with light rays from black lamps at an intensity of ultraviolet radiation of 1.6 mW/cm$^2$ on the surfaces of the photocatalyst D. The concentration of the acetoaldehyde was reduced to 20 ppm after one hour of irradiation and 6 ppm after two hours, indicating that the acetaldehyde was effectively decomposed by the photocatalytic function of the titanium oxy compounds.

As described above, in an embodiment of the present invention there is provided a photocatalyst comprising inorganic porous particles having photosemiconductor particles deposited on at least a part of the surfaces and at least a part of the walls of the pores of the particles, wherein the photocatalyst has a stable photocatalytic function for an extended period of time and easy separability from the treated water system so that it is useful for various photocatalytic reactions such as decomposition and purification of malodorous gases, purification of air, oxidation of sulfur oxides and nitrogen oxides, sterilization of soil, decomposition reaction with water, carbon dioxide immobilizing reaction, and the like. Particularly the disposition of the photocatalysts of the present invention in the regions where the photocatalysts come into contact with water to be treated and the subsequent irradiation with light rays containing ultraviolet radiation allow annihilation of harmful organisms such as algae, fungi and bacteria, decomposition of deleterious materials, as well as deodorization and decoloration to be conveniently and easily accomplished. Therefore, the photocatalysts of the present invention are extremely useful in purification of water in industry as well as at home. Moreover, they can be used for destroying disease germs which may occur in the regions cultivating fish and the like to save them from death.

In another embodiment of the present invention there is provided a photocatalyst comprising inorganic porous particles having photosemiconductor particles and microorganisms possessing water purification activity deposited on at least a part of the surfaces and at least a part of the walls of the pores of the particles, which allows the purification of water by the photocatalytic function of the photocatalyst in the regions irradiated with the light rays containing ultraviolet radiation as well as the purification of water by the water purification activity of the microorganisms deposited on the photocatalyst in the regions not exposed to the light rays containing ultraviolet radiation in the same reaction system, so that the purification of water to be treated can be achieved in a short time.

The photocatalysts according to the present invention are higher in safety, applicable to the treatment of a wide variety of harmful substances, and disposal without causing environmental contamination, so that they are very useful in industry.

What is claimed is:

1. A photocatalyst comprising inorganic porous particles having photosemiconductor particles and microorganisms possessing water purification activity deposited on at least a part of the surfaces and at least a part of the walls of the pores of the particles wherein said microorganisms possessing water purification activity are selected from the group consisting of nitrite bacteria, nitrate bacteria and sulfur bacteria.

2. The photocatalyst according to claim 1, wherein said inorganic porous particles have an average particle size of about 0.1 to about 100 mm.

3. The photocatalyst according to claim 1, wherein said photosemiconductor particles are selected from the group consisting of titanium oxy compounds.

4. The photocatalyst according to claim 3, wherein said titanium oxy compounds are titanium oxides.

5. The photocatalyst according to claim 1, wherein said inorganic porous particles are selected from the group consisting of naturally occurring minerals.

* * * * *